United States Patent [19]

Arora

[11] Patent Number: 4,594,600
[45] Date of Patent: Jun. 10, 1986

[54] INTEGRATED LASER DIODE SCANNER
[75] Inventor: Sanjiv Arora, Sunnyvale, Calif.
[73] Assignees: Ricoh Company, Ltd., Tokyo, Japan; Ricoh Systems, Inc., San Jose, Calif.
[21] Appl. No.: 659,771
[22] Filed: Oct. 11, 1984
[51] Int. Cl.$^4$ ............................................. G01D 15/14
[52] U.S. Cl. .................................... 346/160; 346/108; 369/122
[58] Field of Search ................ 346/160, 108; 358/292; 369/122; 355/3 R; 250/551

[56] References Cited
U.S. PATENT DOCUMENTS 3,698,006 10/1972 Ovshinsky ........................... 346/160
4,109,998 8/1978 Iverson ............................ 250/551 X
4,479,133 10/1984 Shiozawa ............................ 346/108

Primary Examiner—Joseph W. Hartary
Attorney, Agent, or Firm—Flehr, Hohbach, Test, Albritton & Herbert

[57] ABSTRACT

Laser scan/electrophotographic non-impact printer is disclosed which comprises one or more laser diodes mounted on a rotating turntable, the angular scan of the laser diode being generated by rotation of the turntable. An optical system is provided for each beam emitted from the laser diode to shape and direct the beam toward the photosensitive surface. The information is carried on the beam by modulating the beam with the information output of the computer at the source of the beam. To increase the efficiency of the output of the device, the front and rear surfaces of the laser diodes may both be used.

To overcome the difficulty of providing the necessary power to drive the laser diodes to the rotating turntable, a power source comprising a solar cell array illuminated by a lamp is provided. Preferably, this solar cell array is mounted on a surface above the surface of the laser diodes, so that it is easily carried by the rotating turntable. A rotating battery or power generator could also be used.

To provide the information modulation to the laser diode outputs, preferably a photodiode or similar light sensitive device is mounted above the rotating turntable, with the control signal being provided by an LED through a fiber optic element or the like. Thus, the photo detector can be mounted to rotate with the laser diodes, while the LED or other source of light control signals is stationary relative to the rotating turntable.

17 Claims, 6 Drawing Figures

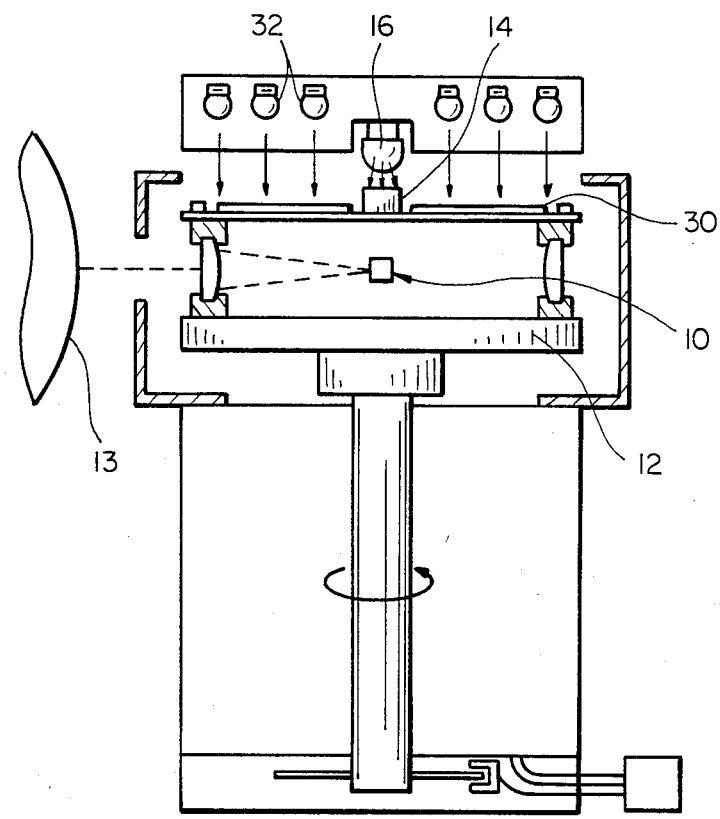
FIG_1
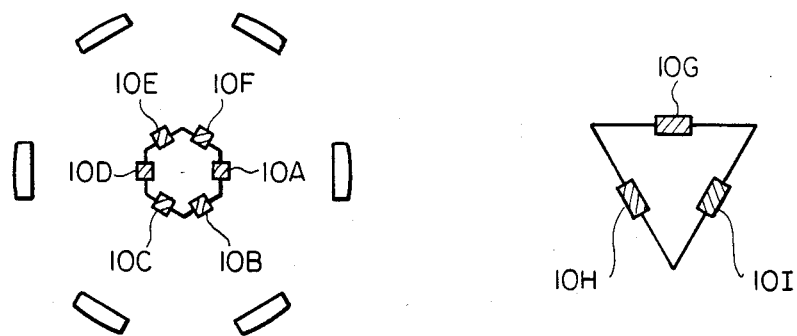
FIG_3A   FIG_3B

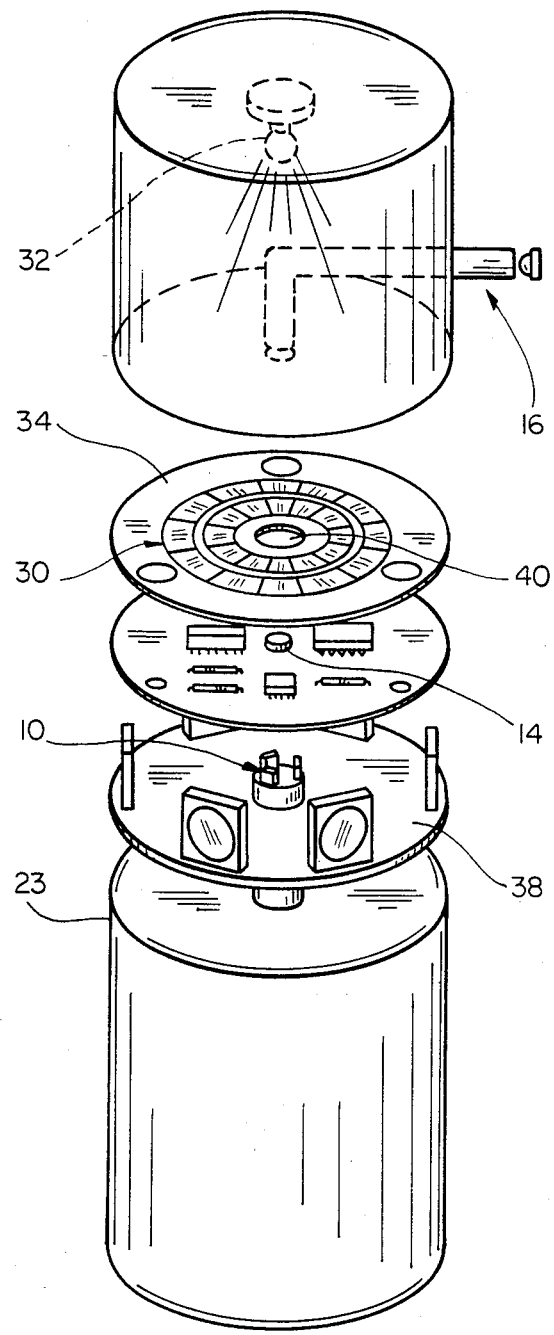
FIG_2

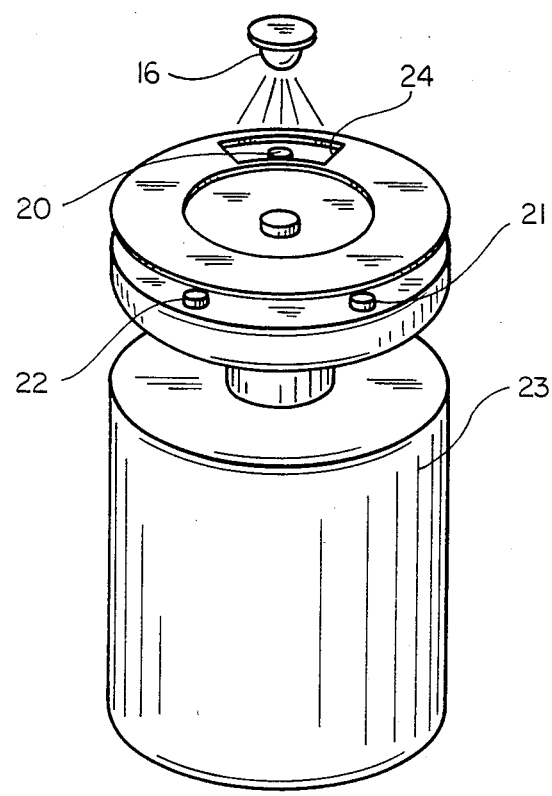
FIG_4
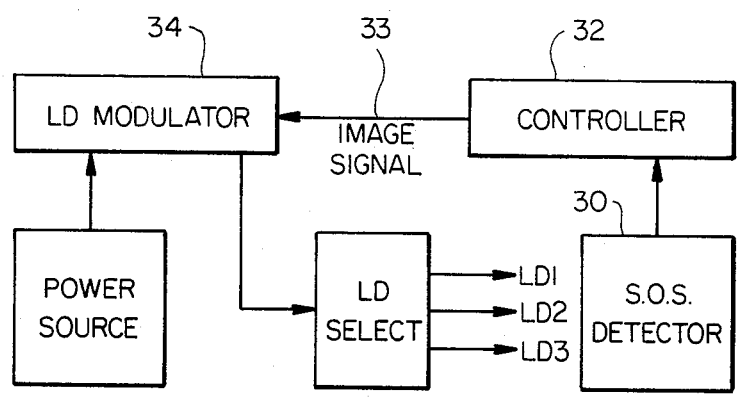
FIG_5

INTEGRATED LASER DIODE SCANNER

The present invention relates to a scanning apparatus for use in exposing the photoconductive drum in an electrophotographic copying machine to the high-speed output of a computer or the like and more particularly to scanning apparatus utilizing an information modulated laser diode.

The present invention is especially suitable for use in a typical electrophotographic copying apparatus such as is presently used in the industry. This typical apparatus includes a rotatable drum having a photosensitive outer circumferential surface, and means for rotating the drum in a controlled fashion so that its outer surface defines a fixed angular path of movement. The apparatus produces copies by first forming an electrostatic image corresponding to the particular information being copied on the photosensitive outer circumferential surface of the drum. Thereafter, the latent image is developed by means of toner particles, specifically electrically charged heat fusible particles, which are applied to the image bearing surface in a specific way. Finally, the applied toner particles are transferred from the drum to the blank sheet, and thereafter fused on the blank sheet for transforming the sheet into a permanent copy of the image. After the toner transfer is complete, the drum is cleaned so that no trace of the electrical image either is represented by toner particles or a static electrical charge remains.

An objective of the present invention is to provide an improved method and apparatus for exposing the photosensitive outer surface of the drum to information to be copied.

A further objective of the present invention is to provide a means of conveying the high-speed output of a computer or the like to the photosensitive surface of the recording drum.

The increase in automation of offices utilizing computers and the like has been accompanied by a tremendous increase in the demand for peripherals which can handle the high-speed output of such computers and printed into hard copy. The market has shown a vigorous appetite for non-impact printers which are more capable of the high-speed printing which is required to keep pace with high-speed computer output. Extensive research has been conducted on ink jet, thermal transfer, laser scan/electrophotographic and other technologies where cost, reliability, versatility, speed and image quality are no longer just desirable but necessary to keep in step with customer's increasing sophistication.

An objective of this invention is to provide an inexpensive laser scan/electrophotographic non-impact printer. These and other objectives are achieved by the present invention, which consists essentially in mounting one or more laser diodes on a rotating turntable, the angular scan of the laser diode being generated by rotation of the turntable. An optical system is provided for each beam emitted from the laser diode to shape and direct the beam toward the photosensitive surface. The information is carried on the beam by modulating the beam with the information output of the computer at the source of the beam. To increase the efficiency of the output of the device, the front and rear surfaces of the laser diodes may both be used.

To overcome the difficulty of providing the necessary power to drive the laser diodes to the rotating turntable, in a preferred embodiment of the invention a power source comprising a solar cell array illuminated by a lamp is provided. Preferably, this solar cell array is mounted on a surface above the surface of the laser diodes, so that it is easily carried by the rotating turntable. Of course, a rotating battery or power generator could also be used.

To provide the information modulation to the laser diode outputs, preferably a photodiode or similar light sensitive device is mounted above the rotating turntable, with the control signal being provided by an LED through a fiber optic element or the like. Thus, the photo detector can be mounted to rotate with the laser diodes, while the LED or other source of light control signals is stationary relative to the rotating turntable.

Other objectives and advantages of the present invention will become apparent to a person skilled in the art who reviews the subject invention disclosure in conjunction with the following figures:

FIG. 1 shows an elevational section of a rotating laser diodes and the platform which carries it, as well as its relationship to light control LED, and the photoconductive drum;

FIG. 2 shows in perspective the relationship of the power source such as the solar cell array which is mounted to rotate with the laser diodes;

FIG. 3 shows in greater detail the relative arrangement of the laser diodes and lenses;

FIG. 4 shows an exemplary mounting of phototransistors for controlling the separate laser diodes; and FIG. 5 is a diagram in simplified form of the electronics utilized in the present invention.

FIG. 1 is a side view of the rotating turntable which carries the laser diodes and power source which are used to implement the present invention. A major feature of the invention consists in mounting at least one and preferably a number of laser diodes 10 on a rotating turntable 12. The angular scan of the beam across a photoconductive drum 13 is generated by the rotation of the turntable 12. As will be explained in greater detail below, for each beam emitted from the laser diode 10, a separate optical system is provided to shape and direct the beam toward the photosensitive surface. As shown in FIG. 1, both the front and rear surfaces of the diode may be used.

The laser diodes are modulated using a photodiode 14 which is mounted above the laser mounting turntable and rotates with the turntable. This photoreceptor 14 receives information signals from an LED 16 which in turn is controlled by the computer output.

The number of laser diodes utilized is a question of some significance. The speed of writing on the photoconductive drum 13 is directly related to the speed of rotation of the turntable (which is limited) and the number of laser diode outputs.

Using a single laser diode and outputs from the front and rear surfaces of the diode, so that an output is transferred to appear twice on each rotation, probably does not provide a sufficient writing speed. By using two laser diodes and stacking one on top of the other, and using the outputs from the front and rear surfaces of each laser, significantly higher speed is attained. Means must be provided to align the stacked beams along a single optical path to reach the photoconductive drum; some mirror arrangement is necessary to accomplish this. It is believed that the optimum arrangement encompasses either six laser diodes 10A–F arrayed on essentially the faces of a hexagon (FIG. 3A) or three laser diodes 10H–I using the front and rear surfaces, the laser diodes being arrayed on the axes of an isosceles triangle as shown in FIG. 3B.

The electronics for controlling such a system would be relatively straightforward. An exemplary block diagram is shown in FIG. 5. A start of scan detector 30 could be utilized; after an initial warm-up period, when the motor 23 is up to full speed, all the laser diodes could be switched on to wait for a signal from the start of scan detector 30. After this signal is received, the controller 32 would periodically switch the laser diodes on and off; this period would be known since the speed of rotation time is known from design calculations. The controller would provide the image signal 33 to be used to modulate the laser diode output to the LED 6 which is to shine on to the phototransistor 14 which serves as LD modulator 34. Preferably, the phototransistor 20, 21, 22 shown in FIG. 4 can respond to the same LED when illuminated through their respective windows 24 to activate the outputs of separate ones of the laser diodes in order to separate the outputs of these diodes. Of course, an alternate source may be preferred.

A further significant feature in the present invention resides in the power supply being mounted for rotation on the turntable with the laser diodes. The semiconductor laser sources (laser diodes) 10 are easily damaged by electrical shocks and break due to electrical noise caused by brushes or slip rings and the like. It is therefore disadvantageous to use these methods to supply power or control signals to the laser diodes when rotating at high speed. To overcome these disadvantages, power to the rotating laser diodes is supplied by a source that is itself rotating along with the laser diodes. In a preferred embodiment of the present invention shown in FIG. 2, this is provided by an array of solar cells 30, which are powered by an appropriate light source 32. The light source may be mounted in a stationary position relative to the rotating turntable; the solar cells themselves are mounted on a turntable 34 which rotates on a common axis with the phototransistor which receives information output from LED 16, and also in parallel with a further turntable 38, which mounts the laser diodes 10. In this way, a self-contained method of conveying the information which is output from a computer and used to control the LED 16 is transferred through the laser diodes 10 at a significantly high rate of speed to the surface of a photoconductive drum.

The control signal itself which is used to modulate the laser diodes is received through the photo diode 14. The light reaches the photo diode by passing through an opening 40 in the parallel turntable 34 above the surface carrying the photodiode. In this manner, the photodiode can rotate easily with the laser diodes, while receiving the optical signal. It is important that the photodiode 14 which is used to receive the control signals be mounted with its axis coincident with the access of rotation so that regardless of the position of the turntable, it receives an optical signal from the stationary light source whose output is being modulated at very high speeds.

This arrangement is an important advantage of the present invention as it eliminates mechanical contact which tends to degrade due to friction, a significant restraint in prior known systems. Other modifications of the present invention may be come apparent to a person of skill in this art who has studied the subject invention disclosure. Therefore, the present invention is to be limited only by the scope of the following claims.

What is claimed is:

1. An integrated laser diode scanner for scanning an information modulated laser beam across a surface comprising a rotating turntable carrying a source of said laser beam, a power source for said laser diode mounted on a further turntable for rotation with said laser source, lens means for focusing said laser output along a transmission path to the surface, and means responsive to an information signal sequence for modulating said laser beam, said laser modulating means comprising a light sensitive device mounted for rotation with said turntable and responsive to a light source containing said modulation information to impress the information on the output of the laser source.

2. An improved laser diode scanner as claimed in claim 1 wherein said laser beam source comprises a plurality of lasers mounted so that the outputs of said lasers successively impact said copying surface.

3. An improved laser diode scanner as claimed in claim 2 wherein said lasers are mounted on the axes of an equilateral triangle.

4. An improved laser diode scanner as claimed in claim 3, including means for focusing outputs from both ends of said lasers on the copying surface.

5. An improved laser diode scanner as claimed in claim 4 wherein the outputs of both ends of said scanner lie on the axes of said equilateral triangle.

6. An improved laser diode scanner as claimed in claim 1 wherein said light sensitive device comprises a photodiode connected to modulate the drive current to the laser.

7. An improved laser diode scanner as claimed in claim 6 wherein the light sensitive device is mounted coincident with the axis of rotation of the turntable.

8. An improved laser diode scanner as claimed in claim 7 wherein said modulating light source is stationary relative to said light sensitive device.

9. An integrated laser diode scanner for scanning an information modulated laser beam across the surface comprising a rotating turntable carrying a source of said laser beam, a power source for said laser diode mounted on a further turntable for rotation with said laser source, lens means for focusing said laser output along a transmission path to the surface, and means responsive to an information signal sequence for modulating said laser beam, said power source turntable comprising a substantially planar support parallel with the upper surface of said turntable, said power source including photovoltaic cell means for generating drive power for said laser source, and a light source for powering said cell means.

10. An improved laser diode scanner as claimed in claim 9 wherein said photovoltaic cell means comprise an array of photovoltaic cells.

11. An improved laser diode scanner as claimed in claim 10 wherein said light source is stationary.

12. In an electrophotographic copying apparatus in which electrically charged toner of one polarity corresponding to an image to which a photoconductive surface of a drum is exposed is transferred from the oppositely electrically charged surface of the drum to the front side of a blank sheet of paper, an improved system for selectively exposing said photoconductive surface to a light source comprising a turntable for mounting a plurality of lasers, a power source for said plurality of lasers mounted on a further turntable for rotation with said plurality of lasers, means for rotating said platform at constant speed, means for focusing the output of the lasers along a transmission path to the drum surface, and means for modulating said lasers comprising a light sensitive device mounted for rotation with said turntables and responsive to a light source containing said modulation information to impress the information on the output of the laser source, the drum being rotatable past the plane of the turntable surface to expose a succession of lines on said drum to said modulated laser.

13. An improved laser diode scanner as claimed in claim 12, wherein the lasers are mounted on the axes of an equilateral triangle on the surface of said platform including means for focusing outputs from both ends of said lasers on the copying surface.

14. An improved laser diode scanner as claimed in claim 14 wherein said power source turntable comprises a substantially planar support parallel with the upper surface of said turntable, said power source including photovoltaic cell means for generating drive power for said laser source, and a light source for powering said cell means.

15. An improved laser diode scanner as claimed in claim 12 wherein said light sensitive device comprises a photodiode connected to modulate the drive current to the laser.

16. An improved laser diode scanner as claimed in claim 15 wherein the light sensitive device is mounted coincident with the axis of rotation of the turntable.

17. An improved laser diode scanner as claimed in claim 16 wherein said modulating light source is stationary relative to said light sensitive device.

* * * * *